United States Patent Office 2,934,789
Patented May 3, 1960

---

2,934,789

MANUFACTURE OF ACOUSTIC FIREPROOF TILES

Henry William Heine, Washington, D.C.

No Drawing. Application September 3, 1958
Serial No. 758,867

2 Claims. (Cl. 18—47.5)

This invention relates to the manufacture of ceramic tile having the acoustic property of high sound absorption.

More specifically, this application is a continuation in part of my Patent No. 2,877,532 filed September 13, 1957, which in turn is a continuation of my abandoned application Serial No. 324,852 filed December 8, 1952, each describing and claiming an acoustic tile as a product and its method of manufacture.

The overall purposes of this invention are: that the tile be capable of withstanding sufficiently high temperatures to answer fireproofing requirements; that the tile have sufficient compression and tensile strengths to withstand handling and the customary service requirements; and finally, that the materials used for the tile be plentiful and inherently lend themselves to the manufacture of ceramic acoustic tile with the foregoing properties.

It is a further objective of this invention that the method of manufacture be such that acoustic ceramic tile with the properties I have above defined be relatively inexpensive to manufacture.

In my Patent 2,877,532, issued March 17, 1959 I define as my invention a ceramic fireproof tile having a crumbly porous core which is light in weight, economical to manufacture pursuant to the method defined and materials used, and is without treatment for imparting mechanical strength thereto; said core having a protective envelope adapted to provide mechanical strength for handling the tile, which consists in glaze surface coverings with open pores communicating with pores in the core.

In my copending application Serial No. 683,687 the specific method for the manufacture of fireproof acoustic tile of the type above defined without treatment for imparting mechanical strength to said core, consists, first in preparing a mix comprising 13 to 30 parts of ceramic materials i.e., approximately 70% diatomaceous earth and 30% clay, the latter preferably containing a natural glazing frit, of a known amount, then adding 7 to 30 parts of carbonaceous material, and sufficient glazing frit in dispersion to supplement the glazing materials or frit already in the mix for making a total of 1¼ to 2½ parts of the mix; and then adding 10 to 70 parts of water to produce a plastic mix from which tile forms can be made with as much water therein as said forms will hold and still retain a given shape. The next step is to form the plastic mix which is followed by shaping the tile cores therefrom. The final step is to subject the tile forms to a kiln or oven temperature between 1900° and 2300° F., the maximum temperature being reached as quickly as possible and maintained between 1½ to 3½ hours. These steps of manufacture will produce from the materials employed the fireproof acoustic tile with the properties and structural features set forth in the preceding paragraph.

With the present invention the steps are broadly the same as in my pending application Serial No. 683,687. I also employ the same ceramic materials i.e., approximately 70% diatomaceous earth and 30% clay. Respecting the carbonaceous material for the mix I employ about the maximum stated for the mix in my copending application for purposes which will later appear. The time period for heat treatment is also about the same i.e., 1½ to 3½ hours. Also, the maximum temperature range for heat treatment of the tile core in an oven or kiln is about the same as with my application i.e., between 1700° and 2300° F.

For the glazing of the tile with perforations communicating with the porous core, I depend on the salts brought to the surfaces of the cores during the heat treatment by the steam and gases resulting from the water and sawdust in the mix through the pores previously made by steam and gases from the same sources. The salts are derived from the mineral impurities of the ceramic materials constituting the mix from which the tile cores are made, plus the addition of a soluble mineral salt including a vanadium salt, which are introduced into the cores through the water used for the mix.

For the protective covering of the porous crumbly tile core, in the present invention I depend upon the salts resulting from the mineral impurities in the ceramic materials used for the mix, plus the addition of a soluble mineral salt, and a small amount of vanadium salt. More specifically, the vitrified salts used for the protective core covering in the present invention is the equivalent of fused salts such as delivered by efflorescence action to the surface of bricks after being manufactured. With bricks the manufacturer sometimes employe additives to the mix for negativing efflorescence action while I do the reverse i.e., increase the delivery of mineral salts by adding a soluble salt to the tile core mix including a vanadium salt, and then through a continuously rising kiln temperature increase continuously the solubility of most of the salts in the mix at a rate at times greater than that of the temperature rise. These rates can be compared by observing the salts being delivered to the core surfaces by the steam and gases generated from the water and sawdust within the core through pores previously formed by steam and gases from the same sources.

I find that with the higher kiln temperatures, say between 1000° to 1200° F. the increase of salts being delivered tis uniform but that thereafter there are gaps in which the delivery is considerably lowered, if not stopped altogether. It is in these higher ranges of temperature I believe the vanadium salts added to the mix serves to increase the salts delivered to the core surfaces over a certain temperature range. For example, when a calcium salt was added to the mix with the vanadium salt the greatest delivery of salts to the core surfaces occurred in the temperature range between 1100° and 1300° F., while when an aluminum salt was added with a vanadium salt the maximum delivery of salts to the surfaces of the tile core cocurred over the temperature range of 1400° to 1700° F.

Diatomaceous earth is known to be a silicate of organic origin and deposits occur in various regions of the earth as the skeletal residues of certain forms of aquatic animal life. It is characterized in one respect by the fact that the skeletal structures of these animals, called diatoms, are essentially siliceous rather than calcareous as in the case of other forms of animal life. It is also characterized by the fact that the skeletal structures of diatoms are multi-formed, that is some of them are filimental, some are circular or oval, some are star shaped, some are tubular or drum shaped and still others are of non-descriptive or non-geometrical shapes. The particles are essentially hollow and of graduated microscopic size. They have no definite cleavage planes as in the case of mineral silicates such as the various forms of quartz or tridymite. The diversified forms of diatomaceous earth particles may be compared somewhat to snow and which in the natural state is fluffy by virtue of different crystalline forms. In diatomaceous earth the property of fluffiness is inherent due to the presence of the different skeletal forms and acting in this respect essentially as snow crystals and differing from other forms of mineral silicates in much the same manner as snow differs from flakes of ice. By virtue of this inherent property and the hollow structure of the skeletal particles, diatomaceous earth has inherent porosity and the ability to become fluffy; it is plentiful, and it lends itself to the manufacture of the acoustic tile with the properties heretofore defined.

The impurities in diatomaceous earth and clay constituting the ceramic materials I employ for producing tile of this invention contain a variety of minerals such as potassium, sodium, calcium, magnesium and aluminum. It is my belief that during the kiln treatment of the tile core the burning of the carbonaceous material produces soluble sulfate compounds from the minerals in the ceramic materials employed, including those added, and thus provide white salt deposits on the surfaces of the tile. However, the vanadium salt when used will sometimes cause a slight green tinge in the covering of the tile core.

During the kiln treatment the salt deposit starts when the heat is sufficient to convert water in the core to steam. The steam makes channels or pores through the core and escapes; it carries to the core surfaces the soluble salts. These salt deposits begin at about 250° F. and continue as the kiln temperature rises.

At this point it should be noted that I employ a good amount of carbonaceous material (sawdust) in order to hold as much water in the core as possible during the higher kiln temperatures. Keeping water in the sawdust during the higher temperatures is further helped by the fact that the inner part of the core maintains a lower temperature than the crust thereof. This lower temperature is also produced by the fact that the tile cores are placed on pallets in the kiln and one face protected from the heat to a certain extent. But little glazing salts come to this protected surface of the tile cores, however, the inner part of the cores near this protected surface remains soft and moist during the higher kiln temperatures. This wet or moist sawdust permits the generation of steam to bring soluble salts to the surfaces of the core with kiln temperatures as high as 1700° F. except from 1100° up to 1700° the steam is intermingled with the gases from the burning of the sawdust beginning with the particles nearest the surface of the core and gradually working inwardly until all the sawdust is consumed and all soluble salt has been delivered to the core surfaces by the combined action of the steam and gases. Thereafter between 1900° and 2300° F. the salts vitrify and a tough porous covering is had for the tile of sufficient mechanical strength to withstand handling and to withstand the stresses and strains to which acoustic tile as provided by this invention are customarily subjected.

A tile manufactured pursuant to my invention has very high sound absorption. By closing the surface pores with a suitable glaze the tile becomes an excellent insulator to heat. This is because uncountable intercommunicating pores or channels, and cavities provide air chambers or passages which serve as heat insulation to the extent that a torch applied on one side of the tile produces little heat on the other side. Briefly, by brushing or spraying the tile surfaces with glazing material sufficient to fully close the surface pores of the tile and then treating the tile to heat for fusing or vitrification of the glaze material provides a tile for heat insulation but not sound absorption.

Soluble salts of a number of other minerals than named above may be used for supplementing the salts derived from the ceramic materials used for the tile core mix. Some of the minerals are barium, iron, zinc, tin, chrome, cobalt and lead.

In proportional amounts a mix may consist of 15 to 30 parts of ceramic materials, about 20 to 30 parts of sawdust; a supplement of about 1¼ to 2½ parts of soluble salts including a soluble vanadium salt, and 40 to 70 parts of water. Good results have been obtained by using a mixture of about 70% of diatomaceous earth and 30% of clay for the ceramic materials and about 80% of a soluble calcium salt, and 20% of a soluble vanadium salt for supplemental salts. The same percentages were used for the supplemental salts when a soluble aluminum salt was substituted for the calcium salt. The amount of water used should be such as is best for shaping the tile cores from the plastic mass i.e., all the water the mix will take and still provide core forms which will hold their shape. Various clays may be used for the mix, such as potters clay, fire clay, kaolin, etc., or mixtures thereof.

My process or method of manufacture essentially consists of three procedures, the first being to prepare the plastic mix from the materials I have heretofore specified with water; the second being to shape the tile cores from the plastic mass; and the third being to subject the cores to a one heat treatment for producing the finished tile.

Any suitable equipment may be used for shaping the tile cores. The kiln should have suitable pallets on which the tile cores may be placed. The temperature of the kiln should be raised as quickly as possible to the temperature necessary for fluxing or vitrifying the salts deposited on the surface of the cores during the heat treatment. The maximum heat is dependent upon the particular soluble salts deposited on the core surfaces including the soluble vanadium salt. I have found this vitrifying temperature is between 1700° and 2300° F. It is important that the heat be cut off from the kiln and cooling started as soon as the fusing or vitrifying of the salts takes place because if the temperature is permitted to rise above the fusing of the salts the perforations in the glaze formed may be closed, or partially so.

I claim:

1. A method for the manufacture of tile with a crumbly porous core and a glaze covering having a multiplicity of surface pores in register with pores in the core, which consists first in preparing a wet-mix of ceramic materials, burn-out materials, and water soluble mineral salts capable of migrating to the surface of the core when subjected to firing temperatures, next shaping tile cores from the mix, and finally subjecting the core to a firing temperature from 1700° to 2300° F. between 1½ to 3½ hours whereby steam from the water in the mix provides pores extending from the tile core through the glaze covering thereof; the ceramic materials in the mix being 13 to 30 parts of diatomaceous earth, 7 to 30 parts of sawdust, 40 to 70 parts of water, and 1¼ to 2½ parts of water soluble salts of which about 20% is vanadium salt which in turn co-acts with the other salts to accelerate the solubility thereof during the firing of the core to produce the glaze covering.

2. A method for the manufacture of a ceramic product with a crumbly porous core, and a glaze covering having a multiplicity of surface pores in register with pores in the core, which consists, first in preparing a wet-mix of ceramic materials, burn-out materials having the property of water absorption, and water soluble mineral salts capable of migrating to the surface of the core to provide the glaze covering therefor when said core is subjected to firing temperatures, next shaping a product core from the mix, and finally subjecting the core to a firing temperature from 1700° to 2300° F. between 1½ to 3½ hours whereby steam from the water in each core provides pores extending from said core through the glaze covering thereof; the ceramic materials in the mix being 13 to 30 parts of diatomaceous earth, 7 to 30 parts of burn-out materials, 40 to 70 parts of water, and 1¼ to 2½ parts of water soluble salts of which about 20% is a vanadium salt whereby the solubility of the mineral salts is increased during the higher temperature of core firing for producing the glaze covering.

(References on following page)

References Cited in the file of this patent

UNITED STATES PATENTS

| | | | |
|---|---|---|---|
| 1,897,667 | Husain et al. | Feb. 14, 1933 |
| 1,941,403 | Lansing et al. | Dec. 26, 1933 |
| 1,999,371 | Parsons | Apr. 30, 1935 |
| 2,124,086 | Slidell | July 19, 1938 |
| 2,241,705 | Goodrich | May 13, 1941 |
| 2,552,553 | Heine | May 15, 1951 |
| 2,877,532 | Heine | Mar. 17, 1959 |